(12) United States Patent
Seabourne et al.

(10) Patent No.: US 12,471,675 B2
(45) Date of Patent: Nov. 18, 2025

(54) COATED SHOE UPPER

(71) Applicant: adidas AG, Herzogenaurach (DE)

(72) Inventors: Jorma Sebastian Seabourne, Herzogenaurach (DE); Martin Love, Herzogenaurach (DE); Sabine Klett, Herzogenaurach (DE); Didick Suarto, Herzogenaurach (DE); Nk Park, Herzogenaurach (DE); Iwan Djung, Herzogenaurach (DE); Lasman Mahulae, Herzogenaurach (DE)

(73) Assignee: adidas AG, Herzogenaurach (DE)

(*) Notice: Subject to any disclaimer, the term of this patent is extended or adjusted under 35 U.S.C. 154(b) by 5 days.

(21) Appl. No.: 18/614,008

(22) Filed: Mar. 22, 2024

(65) Prior Publication Data

US 2024/0225195 A1    Jul. 11, 2024

Related U.S. Application Data (63) Continuation of application No. 16/286,426, filed on Feb. 26, 2019, now Pat. No. 11,963,580.

(30) Foreign Application Priority Data

Mar. 6, 2018  (DE) ..................... 10 2018 203 297.1

(51) Int. Cl.
*A43B 23/02* (2006.01)
*A43B 5/02* (2006.01)
(Continued)

(52) U.S. Cl.
CPC ............ *A43B 23/0235* (2013.01); *A43B 5/02* (2013.01); *A43B 23/021* (2013.01);
(Continued)

(58) Field of Classification Search
CPC ............. A43B 23/021; A43B 23/0235; A43B 23/0215; A43B 23/0245; A43B 23/025;
(Continued)

(56) References Cited

U.S. PATENT DOCUMENTS

| | | |
|---|---|---|
| 2,398,623 A | 4/1946 | Daniels |
| 4,050,108 A | 9/1977 | Londner |

(Continued)

FOREIGN PATENT DOCUMENTS

| | | |
|---|---|---|
| AT | 314393 B | 4/1974 |
| CN | 102665468 A | 9/2012 |

(Continued)

OTHER PUBLICATIONS

Chinese Notification of the Third Office Action issued in Chinese Application No. 201910144571.5, mailed Jul. 9, 2021, 19 pages.

(Continued)

*Primary Examiner* — Lynda Salvatore
(74) *Attorney, Agent, or Firm* — Sterne, Kessler, Goldstein & Fox P.L.L.C.

(57) ABSTRACT

The present invention concerns a shoe upper, including (a) a first sheet, (b) a second sheet, (c) a connecting region in which the first sheet is connected to the second sheet, and (d) a first coating. The first coating is applied onto a first region of the first sheet, a second region of the second sheet, and a third region of the connecting region. The first region, the second region, and the third region are connected.

19 Claims, 5 Drawing Sheets

(51) Int. Cl.
    *A43C 15/02*      (2006.01)
    *A43C 15/16*      (2006.01)
    *D06N 3/00*      (2006.01)
    *D06N 3/14*      (2006.01)
    *D06N 7/00*      (2006.01)

(52) U.S. Cl.
    CPC ...... *A43B 23/0215* (2013.01); *A43B 23/0245* (2013.01); *A43B 23/025* (2013.01); *A43B 23/0255* (2013.01); *A43B 23/026* (2013.01); *A43B 23/0295* (2013.01); *D06N 3/0009* (2013.01); *D06N 3/144* (2013.01); *D06N 7/0092* (2013.01); *A43C 15/02* (2013.01); *A43C 15/16* (2013.01); *D06N 2203/068* (2013.01); *D06N 2211/106* (2013.01); *D10B 2501/043* (2013.01)

(58) Field of Classification Search
    CPC .............. A43B 23/0255; A43B 23/026; A43B 23/0295; A43B 5/02; A43B 23/0205; A43C 15/02; A43C 15/16; D06N 2203/068; D06N 2211/106; D06N 3/0009; D06N 3/144; D06N 7/0092; D10B 2501/043
    See application file for complete search history.

(56) References Cited

U.S. PATENT DOCUMENTS

| | | | |
|---|---|---|---|
| 6,177,198 | B1 | 1/2001 | Schaefer |
| 6,986,183 | B2 | 1/2006 | Delgorgue et al. |
| 8,321,984 | B2 * | 12/2012 | Dojan ................. B29D 35/148 12/142 R |
| 8,402,676 | B2 | 3/2013 | Blücher |
| 10,455,885 | B2 | 10/2019 | Tamm |
| 2006/0141228 | A1 * | 6/2006 | Rearick ............. A43B 23/0215 428/212 |
| 2008/0274307 | A1 | 11/2008 | Chereau et al. |
| 2009/0025257 | A1 | 1/2009 | Peroni et al. |
| 2016/0331081 | A1 | 11/2016 | Antonelli et al. |
| 2017/0099909 | A1 | 4/2017 | Lee et al. |
| 2018/0064201 | A1 | 3/2018 | Tran et al. |

FOREIGN PATENT DOCUMENTS

| | | |
|---|---|---|
| CN | 103126182 A | 6/2013 |
| DE | 26 52 270 A1 | 5/1977 |
| DE | 10 2005 026 837 B3 | 8/2006 |
| DE | 10 2011 086 742 A1 | 5/2013 |
| DE | 10 2013 207 153 A1 | 10/2014 |
| DE | 10 2014 220 087 A1 | 4/2016 |
| DE | 20 2016 008 322 U1 | 8/2017 |
| EP | 0 363 629 A2 | 4/1990 |
| EP | 0 331 214 B1 | 10/1991 |
| EP | 0 105 046 B2 | 11/1991 |
| EP | 1 827 157 B1 | 8/2009 |
| EP | 3 153 053 A1 | 4/2017 |
| GB | 2 189 191 A | 10/1987 |
| JP | 2016-518487 A | 6/2016 |
| JP | 2017-094056 A | 6/2017 |
| WO | WO 2011/049812 A2 | 4/2011 |
| WO | WO 2014/183170 A1 | 5/2013 |
| WO | WO 2014/167359 A2 | 10/2014 |

OTHER PUBLICATIONS

Chinese Notification of the Third Office Action issued in Chinese Application No. 201910144571.5, mailed Mar. 3, 2021, 18 pages.
Extended European Search Report issued in European Patent Application No. 19157365.8, mailed Jul. 18, 2019, 7 pages.
Japanese Decision of Refusal issued in Japanese Application No. 2019155080, mailed Jun. 22, 2021, 6 pages.
Japanese Notice of Reasons for Refusal issued in Japanese Application No. 2019155080, mailed Jan. 5, 2021, 10 pages.

* cited by examiner

COATED SHOE UPPER

CROSS-REFERENCE TO RELATED APPLICATIONS

This application is a continuation application of U.S. patent application Ser. No. 16/286,426, filed Feb. 26, 2019, issued as U.S. Pat. No. 11,963,580, which claims benefit of priority from German Patent Application No. 10 2018 203 297.1, filed Mar. 6, 2018. Each of these applications are incorporated herein in their entireties by reference thereto.

TECHNICAL FIELD

The present invention relates to a coated shoe upper, in particular for a sports shoe, and a method for producing the same.

PRIOR ART

A shoe usually consists of several different components. Typically, a shoe will comprise at least a sole element and an upper. Shoe uppers are usually made from one or more sheets of just a single material. However, a disadvantage of single-material shoe uppers is that just a single material cannot ideally satisfy the different requirements for different regions of the shoe upper. This is a particularly big problem for ball sports, in which the foot makes contact with a ball. For an ideal level of control of the ball, it is usually preferable to have a rather thin and tight-fitting shoe upper in a toe region of the shoe. On the other hand, a thin material that is desirable for the toe region will not provide the required support in a heel region. Therefore, shoe uppers that consist of a single material are always subject to a compromise due to the different requirements for different regions of the upper. For example, a thicker-than-necessary region will also increase the weight of the upper and hence the weight of the shoe.

It is known to produce shoe uppers with different regions. WO 2014/183170 A1 concerns a football shoe or boot including a sole, an upper and a tongue, wherein the upper includes a flap that overlies the tongue, and at its lateral edges, it is separated from side regions of the upper by respective slits open at their rear ends and closed at their forward ends. The flap has an upper surface that includes a ball control region.

DE 20 2016 008 322 U1 relates to an upper for a shoe, in particular a sports shoe, comprising at least one tape region covering at least 50% of the upper, wherein the at least one tape region comprises a plurality of connected tapes. A further aspect relates to an upper for a shoe, in particular a sports shoe, comprising at least one tape region including a plurality of connected tapes, wherein the tapes are zig-zag stitched to each other on their edges.

Various coatings for shoe uppers are known in the prior art. EP 1 827 157 B1 concerns an article of manufacture, comprising a first substrate, a second substrate comprising a second material different from the first material, and a colour harmonisation coating covering at least a portion of the first substrate and at least a portion of the second substrate. EP 0 105 046 B2 concerns a process for addressing split leather or non-woven fabrics, wherein the liquid coating material is applied to a structured substrate. EP 0 331 214 B1 relates to split leather or leather fibre material provided with a finish. U.S. Pat. No. 6,177,198 B1 concerns leather that has a finish on a buffed surface. U.S. Pat. No. 6,986,183 B2 concerns a shoe and a method of courting a shoe. The method includes assembling the upper on the sole, applying at least one layer of flexible or semi-rigid polymer in liquid state in predetermined areas of the upper, and allowing the polymer to dry. GB 2 189 191 A concerns a process for finishing a raw leather piece in which a dressing and then finishing composition are applied to an intermediate support, independent from the leather piece, and then the coating consisting of layers of the dressing and finishing composition is transferred onto the raw leather piece in the moulding/pressing machine, where the coating is heated by high-frequency electromagnetic radiation.

Different regions of such shoe uppers are usually sewn together. Even if the regions are attached to each other by other means, the region in which two regions are connected comprises an uneven surface which makes it more difficult to control a ball accurately. Moreover, the connecting region may be a weak spot for water to enter the shoe. This is also true, even if each material, by itself, were fairly waterproof.

A problem underlying the present invention is therefore to provide a shoe upper, in particular for a sports shoe, that has an improved level of waterproofness, a smooth surface finish, in order to allow an ideal control of a ball, and that is lightweight.

SUMMARY OF THE INVENTION

This objective is achieved by a shoe upper, comprising: (a) a first sheet, (b) a second sheet, (c) a connecting region in which the first sheet is connected to the second sheet, and (d) a first coating applied onto a first region of the first sheet, a second region of the second sheet, and a third region of the connecting region, wherein the first region, the second region, and the third region are connected.

A sheet in the context of the present invention can be made from any material, for example any textile, leather, fabric, etc. While a sheet may have a two-dimensional shape during production of the sheet, the final shoe upper will have a three-dimensional shape due to three-dimensional deformations of the sheet.

Preferably, the first sheet and the second sheet are made from different materials, by different techniques, and/or have a different thickness. Therefore, the ideal balance between stability in certain regions and as direct a contact as possible in other regions can be achieved by a shoe upper according to the present invention. The compromise usually required in shoe upper designs is not applicable for the shoe upper with the present invention. As a result, the shoe upper according to the present invention is lightweight due to its composite structure.

Moreover, the connecting region, in which the first sheet and the second sheet are joined, has a high level of water-resistance due to the first coating.

The first region, the second region, and the third region may be facing outwards. In other words, the first coating may be applied to an outside of the shoe upper. Since the first coating is applied to a contiguous region, formed by the first region, the second region, and the third region, the upper has an overall smooth outer surface that allows the best possible control of a ball in ball sports as well as an aesthetically pleasing appearance.

The first coating may have been applied by screen-printing. A key aspect of the present invention is that the first and/or second coating can be applied on a component level (e.g. a shoe upper) rather than a sheet-level (e.g. an uncut sheet to be used for a shoe upper). Screen-printing allows a much more precise application of the first coating than techniques such as spraying. Preferably, the first coating is applied to the upper once the first sheet and second sheet have been connected. This may be performed in a single step using screen-printing. This contrasts with conventional processing techniques in which a coating, if present, is applied during the production of each sheet and the sheets are then attached to each other. This conventional process therefore cannot provide the level of waterproofness or the smooth surface finish of the upper according to the present invention. Furthermore, no mask is needed, unlike in a spraying process, thus simplifying the production. Moreover, screen printing allows the thickness of the layer to be controlled accurately.

The first sheet may comprise a leather. Leather is breathable and has a good level of inherent water-resistance. Leather is a preferred material, especially for areas of the upper that come into contact with a ball. This is because leather allows excellent control of a ball as it facilitates a good grip. It feels particularly natural to kick a ball with a sheet comprising leather, since leather has similar properties to the human skin. Moreover, leather is sufficiently resilient to withstand the wear and tear caused by frequent kicking of a ball. However, the advantages of using leather are not limited to shoe uppers for ball sports.

The leather may be a crust leather. In the context of the present invention, a crust leather is any leather that has been tanned but that has not yet received finishing surface treatment such as coating. Crust leather may or may not have been dyed. Crust leather is not used in the manufacture of shoe uppers in the prior art. Instead, coated and finished leather is used in the manufacture of shoe uppers in the prior art. In the prior art, the coating and finishing process happens at the manufacturer of the leather. This is motivated by the intention to reduce water absorption by, damage to, or discoloration of the leather. Using crust leather, instead of finished leather, i.e. coated and/or dyed leather, allows a particularly smooth surface finish and especially a particularly smooth transition between the first sheet and the second sheet. Moreover, the resilience and abrasion resistance of the final shoe upper is thus improved. Another advantage of using crust leather is that the surface is less sensitive than that of finished leather, for example, a coating of finished leather may get damaged but this cannot happen with uncoated crust leather.

The first sheet may have a thickness of between 0.5 and 1.2 mm, preferably between 0.8 and 1.0 mm. This is thinner than the thickness used for sheets in the prior art. The inventors have found that due to the first coating, a smaller thickness than in the prior art can be used and thus the overall weight of the upper can be reduced and, for example, the level of control over a ball can be improved.

The first coating may have a thickness of between 0.08 and 0.3 mm, preferably between 0.09 and 0.12 mm. This level of thickness offers the ideal balance between stability and resilience on the one hand and a low weight and, for example, a good level of control over a ball on the other hand. The thickness is to be determined when the first coating is dry.

The second sheet may comprise a textile. A textile in the context of the present invention is any knitted, woven, or non-woven component. The textile may comprise any natural or synthetic fibre, yarn, or thread. Textiles can be lightweight, breathable and sufficiently sturdy for regions of the upper that need to provide a good level of support to the foot.

The textile may comprise a weft or warp knitted region. Knitting allows a particularly good level of wearing comfort and breathability at a low weight.

The first sheet may be arranged in a forefoot region of the shoe upper and the second sheet may be arranged in a heel region of the shoe upper. This arrangement is advantageous such that the first sheet may guarantee a preferred level of ball control while the second sheet provides sufficient support in the heel region.

The connecting region may comprise a seam connecting the first sheet and the second sheet. A simple, yet robust way of connecting the first sheet and the second sheet is by stitching them together thus creating a seam.

The connecting region may further comprise a seam tape arranged to cover the seam. The seam tape may be arranged below the seam, towards the inside of the shoe upper, and/or above the seam, towards the outside of the shoe upper. This way, the seam is protected from damage and/or water penetration, and the wearing comfort is improved.

Alternatively, the connecting region may comprise a film connecting the first sheet and the second sheet. This way, a particularly smooth and therefore comfortable as well as waterproof connection can be achieved. The film may comprise thermoplastic polyurethane to allow simple activation by heat. However, generally any suitable method may be used for connecting the first sheet and the second sheet and in particular a seam is not required.

The first coating may comprise polyurethane, which could be provided as water-based polyurethane with a content of at least 46% by weight of polyurethane. The water may act as a solvent and evaporate after the application of the first coating, thus leaving a film-like layer of the first coating. The first coating may further comprise silicone. Polyurethane and silicone, also known as polysiloxane, are non-toxic, durable, and waterproof and hence provide for a good protection of the first sheet, the second sheet, and the connecting region. The first coating may further comprise a polyacrylate. A polyacrylate provides good adhesive properties, is resistant to breakage and elastic. The first coating may further comprise a pigment in order to dye the shoe upper without the need for an additional step of dyeing the upper.

The first coating may comprise two sub-layers. An inner sub-layer may comprise at least a first chemical providing a function that is different from a function of a second chemical used in an outer sub-layer, which may act as a top coating. The first chemical used for the inner sub-layer may comprise an adhesive to bond the outer sub-layer with the first sheet, for example with leather fibers. If the first sheet comprises an uneven surface, for example if the first sheet comprises a crust leather, the first chemical may also fill at least one cavity in the surface of the crust leather thus providing a more even base for the top layer. In other words, the inner sub-layer may serve as a primer for the outer sub-layer. The second chemical used for the outer sub-layer may be made to facilitate a soft touch (leather-like touch) and surface performance.

The first coating may comprise a fluoropolymer, such as, for example, polytetrafluoroethylene (PTFE). PTFE is a durable, non-reactive material that is well suited to protecting an underlying material. The fluoropolymer may be applied as a "finish" on top of the first coating.

The shoe upper may further comprise a second coating, wherein the second coating covers at least the second region, where it is arranged between the second sheet and the first coating; and wherein the second coating additionally covers at least the third region, where it is arranged between the first or second sheet and the first coating. The second coating is preferably selected such that it prevents the first coating from being absorbed into the second sheet. Suitable choices of the second coating have a high viscosity or can be suitably applied in the solid-state, for example by an infrared welding process.

The second coating may comprise polyurethane, for example thermoplastic polyurethane. The second coating may be applied as a foil. Polyurethane can be applied, for example by an infrared welding process, without penetrating the second sheet. It provides a protective layer on the second sheet that prevents the first coating from soaking into the second sheet. Polyurethane is also durable and non-toxic. The second coating may further comprise silicone, a polyacrylate, and/or a pigment.

The second sheet may further comprise a fourth region to which the first coating has been applied in a discontinuous manner. For a good mechanical stability against tearing as well as for an improved wearing comfort of the upper it is advantageous to create a fourth region in which the first coating has been applied in a discontinuous manner.

The fourth region may be connected to the second region. The inventors have found, that the tearing resistance is improved, if the coating gradually "fades" starting from an edge of the second region. This also improves the wearing comfort of the upper.

The second sheet may further comprise a fifth region which is not covered by the first coating. Some regions of the second sheet, for example regions that are located some distance away from the first sheet, may not require the first coating. Regions of the second sheet that are located below a heel counter in the final shoe, for example, may not require the first coating. Therefore, it is advantageous in the interest of reducing the overall weight of the upper, for there to be a fifth region that is not covered by the first coating.

The fifth region may be connected to the fourth region. This way, there is a gradual "fading" of the first coating starting from the second region, in which there is a full coverage by the first coating, to the fourth region, in which there is a partial coverage by the first coating, and finally to the fifth region in which there is no coverage by the first coating. This gradual "fading" is advantageous for the mechanical stability of the upper as well as for the wearing comfort.

The invention further concerns a shoe comprising a shoe upper according to one of the preceding claims. In the context of the present invention, a shoe is any article of footwear, especially a sports shoe, for example, a running shoe, a hiking shoe, a hiking boot, a football boot, or soccer boot in some countries, a basketball boot, a tennis shoe, etc. A shoe according to the present invention is lightweight, waterproof, breathable, and provides optimal properties in different regions of the upper, as required.

The invention further concerns a method of producing a shoe upper, comprising: (a) providing a first sheet, (b) providing a second sheet, (c) connecting the first sheet to the second sheet in a connecting region, and (d) applying a first coating onto a first region of the first sheet, a second region of the second sheet, and a third region of the connecting region, wherein the first region, the second region, and the third region are connected.

A sheet in the context of the present invention can be made from any material, for example any textile, leather, fabric, etc. While a sheet may have a two-dimensional shape during production of the sheet, the final shoe upper will have a three-dimensional shape due to three-dimensional deformations of the sheet.

Preferably, the first sheet and the second sheet are made from different materials, by different techniques, and/or have a different thickness. Therefore, the ideal balance between stability in certain regions and as direct contact as possible in other regions can be achieved by a shoe upper according to the present invention. The compromise usually required in designing shoe uppers is not needed for the shoe upper according to the present invention. In particular, the shoe upper according to the present invention is lightweight due to its composite structure.

Moreover, the connecting region, in which the first sheet and the second sheet joined, has a high level of water-resistance due to the first coating.

The first region, the second region, and the third region may be facing outwards. In other words, the first coating may be applied to an outside of the shoe upper. Since the first coating is applied to a contiguous region, formed by the first region, the second region, and the third region, the upper has an overall smooth outer surface that allows the best possible control of a ball in ball sports as well as an aesthetically pleasing appearance.

Applying the first coating may comprise screen printing the first coating. Screen-printing allows a much more precise application of the first coating than techniques such as spraying. Preferably, the first coating is applied to the upper once the first sheet and second sheet have been connected. This may be performed in a single step using screen-printing. This contrasts with conventional processing techniques in which a coating, if present, is applied during the production of each sheet and the sheets are then attached to each other. This conventional process therefore cannot provide the level of waterproofness or the smooth surface finish of the upper according to the present invention. Furthermore, in screen printing, no mask is needed, unlike in a spraying process, thus simplifying the production. Moreover, screen printing allows the thickness of the layer to be controlled accurately.

The first sheet may comprise a leather. Leather is breathable and has a good level of inherent water-resistance. Leather is a preferred material, especially for areas of the upper that come into contact with a ball. This is because leather allows excellent control of a ball as it facilitates a good grip. It feels particularly natural to kick a ball with a sheet comprising leather, since leather has similar properties to the human skin. Moreover, leather is sufficiently resilient to withstand the wear and tear caused by frequent kicking of a ball. However, the advantages of using leather are not limited to shoe uppers for ball sports.

The leather may be a crust leather. In the context of the present invention, a crust leather is any leather that has been tanned but that has not yet received finishing surface treatment such as coating. Crust leather may or may not have been dyed. Crust leather is not used in the manufacture of shoe uppers in the prior art. Instead, coated and finished leather is used in the manufacture of shoe uppers in the prior art. In the prior art, the coating and finished process happens at the manufacturer of the leather. This is motivated by the intention to reduce water absorption by, damage to, or discoloration of the leather. Using crust leather, instead of finished leather, i.e. coated and/or dyed leather, allows a particularly smooth surface finish and especially a particularly smooth transition between the first sheet and the second sheet. Moreover, the resilience and abrasion resistance of the final shoe upper is thus improved.

The first sheet may have a thickness of between 0.5 and 1.2 mm, preferably between 0.8 and 1.0 mm. This is thinner than the thickness used for sheets in the prior art. The inventors have found that due to the first coating, a smaller thickness than in the prior art can be used and thus the overall weight of the upper can be reduced and, for example, the level of control over a ball can be improved.

The first coating may have a thickness of between 0.08 and 0.3 mm, preferably between 0.09 and 0.12 mm. This level of thickness offers the ideal balance between stability and resilience on the one hand and a low weight and, for example, a good level of control over a ball on the other hand. The thickness is to be determined when the first coating is dry.

The second sheet may comprise a textile. A textile in the context of the present invention is any knitted, woven, or non-woven component. The textile may comprise any natural or synthetic fibre, yarn, or thread. Textiles can be lightweight, breathable and sufficiently sturdy for regions of the upper that need to provide a good level of support to the foot.

Providing the textile may comprise warp or weft knitting the textile. Knitting allows a particularly good level of wearing comfort and breathability at a low weight.

The method may further comprise arranging the first sheet in a forefoot region of the shoe upper and arranging the second sheet in a heel region of the shoe upper. This arrangement is advantageous such that the first sheet may guarantee a preferred level of ball control while the second sheet provides sufficient support in the heel region.

Connecting the first sheet and the second sheet may comprise stitching the first sheet and the second sheet along a seam. A simple, yet robust way of connecting the first sheet and the second sheet is by stitching them together thus creating a seam.

Connecting the first sheet and the second sheet may further comprise applying a seam tape to cover the seam. The seam tape may be arranged below the seam, towards the inside of the shoe upper, and/or above the seam, towards the outside of the shoe upper. This way, the seam is protected from damage and/or water penetration, and the wearing comfort is improved.

Alternatively, connecting the first sheet and the second sheet may comprise applying a film to the connecting region. This way, a particularly smooth and therefore comfortable as well as waterproof connection can be achieved. The film may comprise thermoplastic polyurethane and may be melted by applying heat in order to connect the first sheet and the second sheet. However, generally any suitable method may be used for connecting the first sheet and the second sheet and in particular a seam is not required.

The first coating may comprise polyurethane, which could be provided as water-based polyurethane with a content of at least 46% by weight of polyurethane. The water may act as a solvent and evaporate after the application of the first coating, thus leaving a film-like layer of the first coating. The first coating may further comprise silicone. Polyurethane and silicone, also known as polysiloxane, are non-toxic, durable, and waterproof and provide for a good protection of the first sheet, the second sheet, and the connecting region. The first coating may further comprise a polyacrylate. A polyacrylate provides good adhesive properties, is resistant to breakage and elastic. The first coating may further comprise a pigment in order to dye the shoe upper without the need for an additional step of dyeing the upper.

The method may comprise forming two sub-layers in the first coating. An inner sub-layer may comprise at least a first chemical providing a function that is different from a function of a second chemical used in an outer sub-layer, which may act as a top coating. The first chemical used for the inner sub-layer may comprise an adhesive to bond the outer sub-layer with the first sheet, for example with leather fibers. If the first sheet comprises an uneven surface, for example if the first sheet comprises a crust leather, the first chemical may also fill at least one cavity in the surface of the crust leather thus providing a more even base for the top layer. In other words, the inner sub-layer may serve as a primer for the outer sub-layer. The second chemical used for the outer sub-layer may be made to facilitate a soft touch (leather-like touch) and surface performance.

The first coating may comprise a fluoropolymer, such as, for example, polytetrafluoroethylene (PTFE). PTFE is a durable, non-reactive material that is well suited to protecting an underlying material. The outer sublayer may comprise the fluoropolymer such that the fluoropolymer may act as a "finish", or top coating.

The method may further comprise applying a second coating, comprising: covering at least the second region with the second coating, wherein the second coating is arranged between the second sheet and the first coating; and covering at least the third region with the second coating, wherein the second coating is arranged between the first or second sheet and the first coating. The second coating is preferably selected such that it prevents the first coating from being absorbed by the second sheet. Suitable choices of the second coating have a high viscosity or can be suitably applied in the solid-state, for example by an infrared welding process.

The second coating may comprise polyurethane, for example thermoplastic polyurethane. The second coating may be applied as a foil. Polyurethane can be applied, for example by an infrared welding process, without penetrating the second sheet. It provides a protective layer on the second sheet that prevents the first coating from soaking into the second sheet. Polyurethane is also durable and non-toxic. The second coating may further comprise silicone, a polyacrylate, and/or a pigment.

The second sheet may further comprise a fourth region and the method may further comprise applying the first coating to the fourth region in a discontinuous manner. For a good mechanical stability against tearing as well as for an improved wearing comfort of the upper, it is advantageous to create a fourth region in which the first coating has been applied in a discontinuous manner.

The method according the preceding claim, wherein the fourth region is connected to the second region. The inventors have found, that the tearing resistance is improved, if the coating gradually "fades" starting from an edge of the second region. This also improves the wearing comfort of the upper.

The second sheet may further comprise a fifth region which is not covered by the first coating. Some regions of the second sheet, for example regions that are located some distance away from the first sheet, may not require the first coating. Regions of the second sheet that are located below a heel counter in the final shoe, for example, may not require the first coating. Therefore, it is advantageous in the interest of reducing the overall weight of the upper, for there to be a fifth region that is not covered by the first coating.

The fifth region may be connected to the fourth region. This way, there is a gradual "fading" of the first coating starting from the second region, in which there is a full coverage by the first coating, to the fourth region, in which there is a partial coverage by the first coating, and finally to the fifth region in which there is no coverage by the first coating. This gradual "fading" is advantageous for the mechanical stability of the upper as well as for the wearing comfort.

The invention further concerns a method of producing a shoe comprising: (a) producing a shoe upper as described herein (b) lasting the shoe upper (10), and (c) attaching a sole element. In the context of the present invention, a shoe is any article of footwear, especially a sports shoe, for example, a running shoe, a hiking shoe, a hiking boot, a football boot, or soccer boot in some countries, a basketball boot, a tennis shoe, etc. A shoe according to the present invention is lightweight, waterproof, breathable, and provides optimal properties in different regions of the upper, as required.

BRIEF DESCRIPTION OF THE FIGURES

In the following, exemplary embodiments of the invention are described with reference to the figures. The figures show.

DETAILED DESCRIPTION OF EXEMPLARY EMBODIMENTS

In the following only some possible embodiments of the invention are described in detail. It is to be understood that these exemplary embodiments can be modified in a number of ways and combined with each other whenever compatible and that certain features may be omitted in so far as they appear dispensable. While in the following the invention is described particularly with reference to a football shoe/boot in which the first sheet comprises leather, it is to be understood that the invention is not restricted to a football boot or a shoe comprising leather.

Figure 1A:
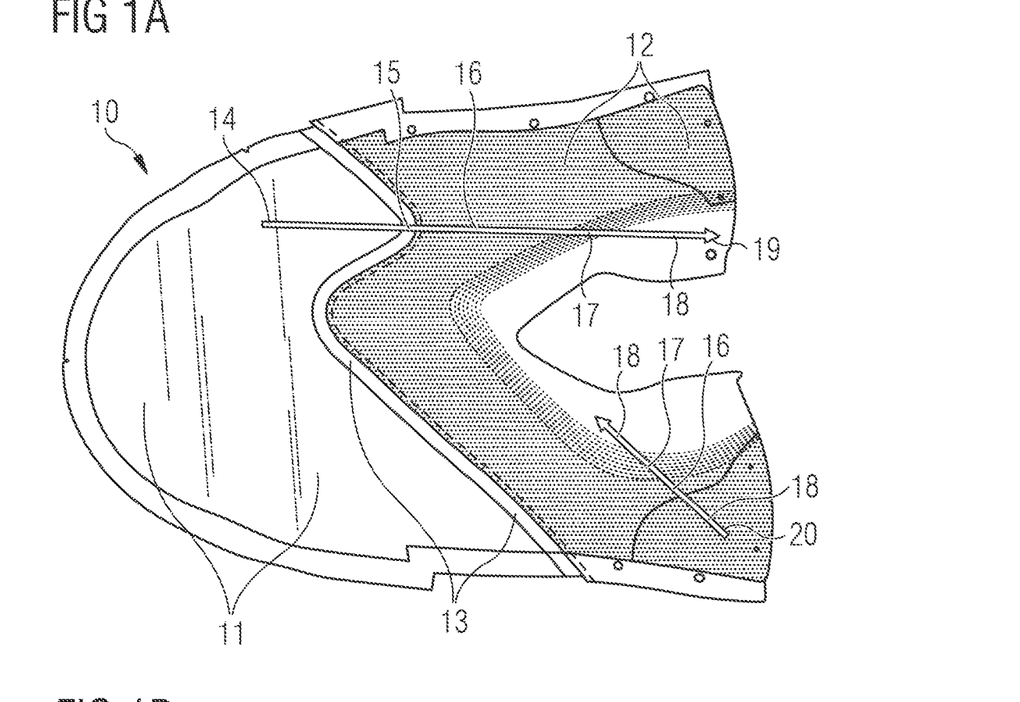
FIGS. 1A-1B: an exemplary shoe upper according to the present invention.

FIG. 1A shows the topside, i.e. what will be the outside on the final shoe, of a shoe upper 10 according to the present invention. In its final form the shoe upper 10 will be lasted to create a three-dimensional shape and attached to a sole element in order to form a shoe.

The shoe upper 10 comprises (a) a first sheet 11, (b) a second sheet 12, (c) a connecting region 13 in which the first sheet 11 is connected to the second sheet 12, and (d) a first coating applied onto a first region 14 of the first sheet 11, a second region 16 of the second sheet 12, and a third region 15 of the connecting region 13, wherein the first region 14, the second region 16, and the third region 15 are connected.

The first sheet 11 and the second sheet 12 are made from different materials, by different techniques, and have a different thickness. Therefore, the ideal balance between stability in certain regions and as direct a contact as possible in other regions can be achieved by a shoe upper 10 according to the present invention. The compromise usually required in designing shoe uppers is not needed for the shoe upper 10 according to the present invention. In particular, the shoe upper 10 is lightweight due to its composite structure.

Moreover, the connecting region 13, in which the first sheet 11 and the second sheet 12 are joined, has a high level of water-resistance due to the first coating. Since the first coating is applied to a contiguous region, formed by the first region 14, the second region 16, and the third region 15, the upper 10 has an overall smooth outer surface that allows the best possible control of a ball in ball sports as well as an aesthetically pleasing appearance.

The first coating has been applied by screen-printing. The screen printing is preferably carried out after attaching the first sheet 11 to the second sheet 12. The first sheet 11 comprises a leather, wherein the leather is a crust leather. The second sheet 12 comprises a textile, wherein the textile comprises a weft or warp knitted region. The first sheet 11 is arranged in a forefoot region of the shoe upper 10 and the second sheet 12 is arranged in a heel region of the shoe upper 10. The connecting region 13 comprises a seam at which the first sheet 11 and the second sheet 12 are connected by sewing. Additionally, the connecting region 13 comprises a seam tape 33. Exemplary embodiments of the seam tape 33 are discussed in relation to FIGS. 2D-E. In general, other techniques for joining the sheets can be used as well, such as welding (e.g. by laser or ultrasound) or gluing. For example, a seam connecting the first sheet 11 and the second sheet 12 is not required as the connection may for example be achieved by a film alone. A film may be substantially similar to the seam tape shown in FIGS. 1A and 2D-E. The film may comprise thermoplastic polyurethane to allow simple activation by heat.

The shoe upper 10 further comprises a second coating, wherein the second coating covers at least the second region 16, where it is arranged between the second sheet 12 and the first coating; and wherein the second coating additionally covers at least the third region 15, where it is arranged between the first 11 or second sheet 12 and the first coating.

Figure 1B:
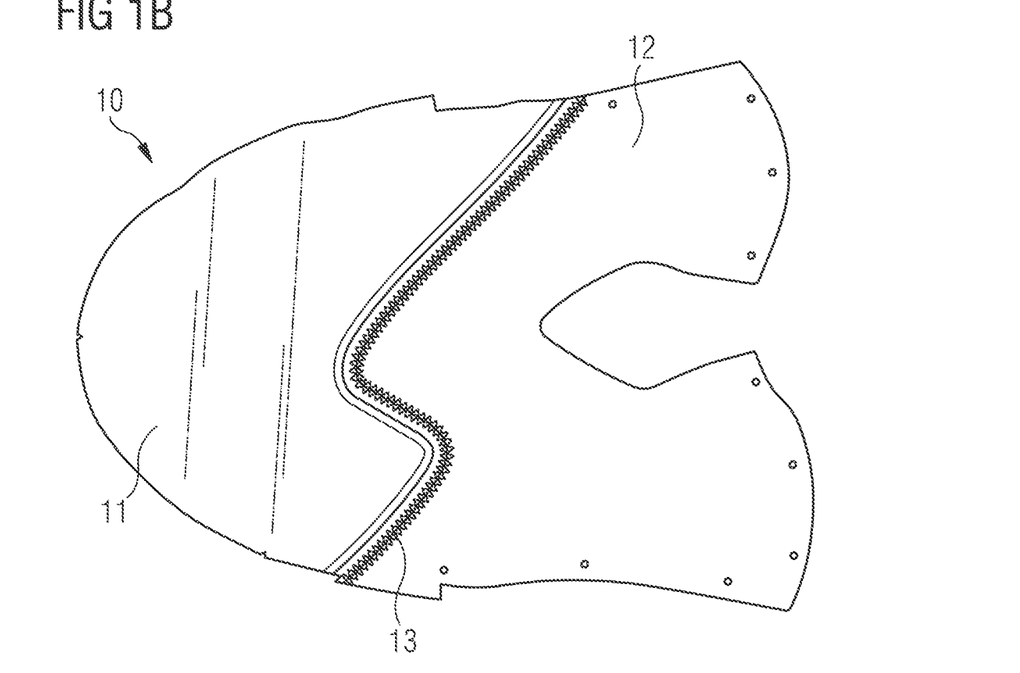

In this example, the second sheet 12 further comprises a fourth region 17 to which the first coating has been applied in a discontinuous manner. The fourth region 17 is connected to the second region 16. The second sheet 12 further comprises a fifth region 18 which is not covered by the first coating, wherein the fifth region 18 is connected to the fourth region 17. However, it is also possible, that the shoe upper 10 does not comprise a fourth region 17 to which the first coating has been applied in a discontinuous manner, as illustrated, for example, in FIGS. 2D-E FIG. 1B shows the rear side, i.e. what will be the inside of the shoe upper in the final shoe, of the exemplary shoe upper of FIG. 1A. FIG. 1B shows the first sheet 11, the second sheet 12, and the connecting region 13 in which the first sheet 11 is connected to the second sheet 12 of the exemplary shoe upper 10. Note that in this example, no coating has been applied to the rear side of the first sheet 11, the second sheet 12, or the connecting region 13. However, it is also possible to apply a first and/or second coating to the rear side, i.e. the inside, of the shoe upper.

Figure 2A:
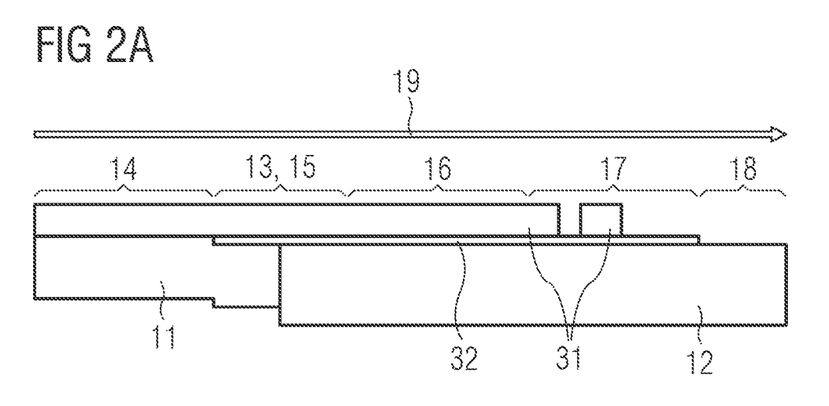
FIGS. 2A-2E: exemplary cross-sectional views of several embodiments of the exemplary shoe upper of FIG. 1 according to the present invention.

FIG. 2A shows an exemplary cross-sectional cut along the arrow indicated with reference numeral 19 for an embodiment of the shoe upper 10 shown in FIG. 1A. This illustrative figure is not to scale. The exemplary cross-sectional cut shows the shoe upper, comprising (a) a first sheet 11, (b) a second sheet 12, (c) a connecting region 13 in which the first sheet 11 is connected to the second sheet 12, and (d) a first coating applied onto a first region 14 of the first sheet 11, a second region 16 of the second sheet 12, and a third region 15 of the connecting region 13, wherein the first region 14, the second region 16, and the third region 15 are connected.

As shown in this exemplary cross-sectional cut, the second sheet 12 further comprises a fourth region 17 to which the first coating has been applied in a discontinuous manner. The fourth region 17 is connected to the second region 16. The second sheet 12 further comprises a fifth region 18 which is not covered by the first coating, wherein the fifth region 18 is connected to the fourth region 17.

The first coating 31 comprises polyurethane and silicone and has a thickness of 0.10 mm. The first sheet 11 has a thickness of 0.8 mm.

The first coating 31 comprises two sub-layers (not shown). An inner sub-layer comprises a first chemical providing a function that is different from the function of a second chemical used in an outer sub-layer, which may act as a top coating. The first chemical used for the inner sub-layer comprises an adhesive to bond the outer sub-layer with the first sheet 11, for example with leather fibers. The first sheet 11 comprises an uneven surface and the first chemical also fills at least one cavity in the surface of the crust leather thus providing a more even base for the top layer. In other words, the inner sub-layer serves as a primer for the outer sub-layer. The second chemical used for the outer sub-layer is made to facilitate a soft touch (leather-like touch) and surface performance.

The first coating 31 comprises a fluoropolymer, in this example polytetrafluoroethylene (PTFE). PTFE is a durable, non-reactive material that is well suited to protecting an underlying material. The outer sublayer comprises the PTFE such that the PTFE acts as a "finish", or top coating.

The shoe upper 10 further comprises a second coating 32, wherein the second coating 32 covers at least the second region 16, where it is arranged between the second sheet 12 and the first coating 31; and wherein the second coating 32 additionally covers at least the third region 15, where it is arranged between the first 11 or second sheet 12 and the first coating 31, in order to prevent the first coating 31 from soaking into the second sheet 12. In this example, the second coating 32 comprises polyurethane.

Note that the first sheet 11 is shown to have a constant thickness along the cross-sectional cut 19 such that the first sheet 11 extends by approximately the thickness of the second coating 32 below the level of the first sheet 11 in the first region 14 of the second sheet 11 when the second coating 32 is applied in the third region 15 of the connecting region 13. However, it is to be understood that the first sheet may also have a reduced thickness in the third region 15 of the connecting region 13 in order to prevent this.

It is also to be noted that the second sheet 12 is shown to have greater thickness than the first sheet 11 along the cross-sectional cut 19. However, it is also possible that the first sheet 11 and the second sheet 12 have the same thickness, or the second sheet 12 may have a greater thickness than the first sheet 11.

Figure 2B:
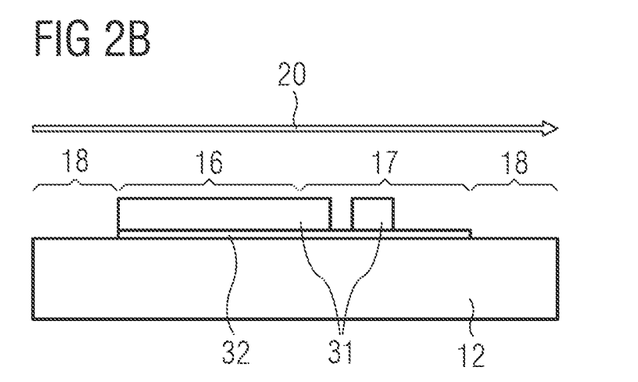

FIG. 2B shows an exemplary cross-sectional cut along the arrow indicated with reference numeral 20 in FIG. 1A. This illustrative figure is not to scale. The exemplary cross-sectional cut shows just the second sheet 12 and the first coating applied onto a second region 16 of the second sheet 12.

As shown in this exemplary cross-sectional cut, the second sheet 12 comprises a fourth region 17 to which the first coating has been applied in a discontinuous manner. The fourth region 17 is connected to the second region 16. The second sheet 12 further comprises a fifth region 18 which is not covered by the first coating, wherein the fifth region 18 is connected to the fourth region 17. The first coating 31 comprises silicone and has a thickness of 0.10 mm.

The shoe upper 10 further comprises a second coating 32, wherein the second coating 32 covers at least the second region 16, where it is arranged between the second sheet 12 and the first coating 31; and wherein the second coating 32 additionally covers at least the third region 15, where it is arranged between the first 11 or second sheet 12 and the first coating 31, in order to prevent the first coating 31 from soaking into the second sheet 12. In this example, the second coating 32 comprises polyurethane.

Figure 2C:
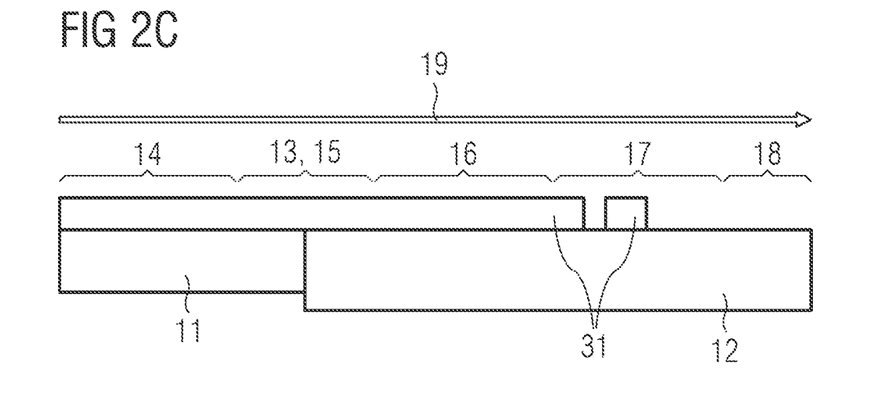
Figure 2D:
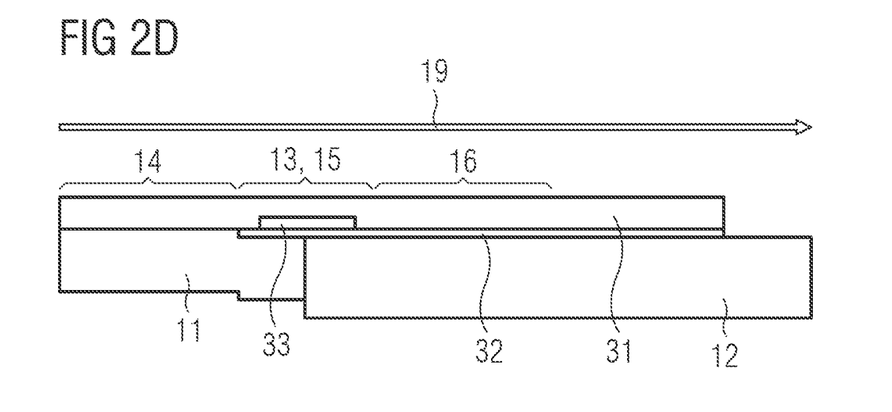
Figure 2E:
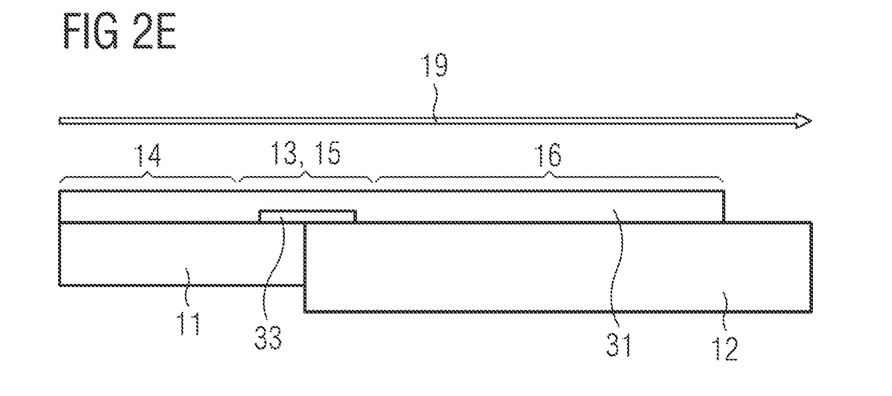

FIG. 2C shows an exemplary cross-sectional cut along the arrow indicated with reference numeral 20 for an alternative embodiment of the shoe upper 10 shown in FIG. 1A. This illustrative figure is not to scale.

The cross-section shown in FIG. 2C for this embodiment is similar to the cross-section shown in FIG. 2A for the other embodiment. However, the shoe upper 10 in this embodiment does not comprise a second coating 32, as can be seen from the cross-section shown in FIG. 2C. Instead, the first coating 31 is applied directly onto the first sheet 11 and the second sheet 12.

FIG. 2D shows another exemplary cross-sectional cut along the arrow indicated with reference numeral 20 for another alternative embodiment of the shoe upper 10 shown in FIG. 1A. This illustrative figure is not to scale.

In this exemplary embodiment, the connecting region 13 comprises a seam at which the first sheet 11 and the second sheet 12 are connected by sewing. A seam tape 13 is applied onto part of the second coating 32, in order to protect the seam and to provide comfort to the wearer. In this example, the seam tape 33 has a film-like shape and comprises thermoplastic polyurethane. In this example, the seam tape 33 is applied above the seam, towards the outside of the shoe upper. However, it is also possible, that the seam tape is applied below the seam, towards the inside of the shoe upper. Moreover, in this example, the shoe upper 10 does not comprise a fourth region 17 to which the first coating has been applied in a discontinuous manner.

FIG. 2E shows another exemplary cross-sectional cut along the arrow indicated with reference numeral 20 for another alternative embodiment of the shoe upper 10 shown in FIG. 1A. This illustrative figure is not to scale.

Figure 3A:
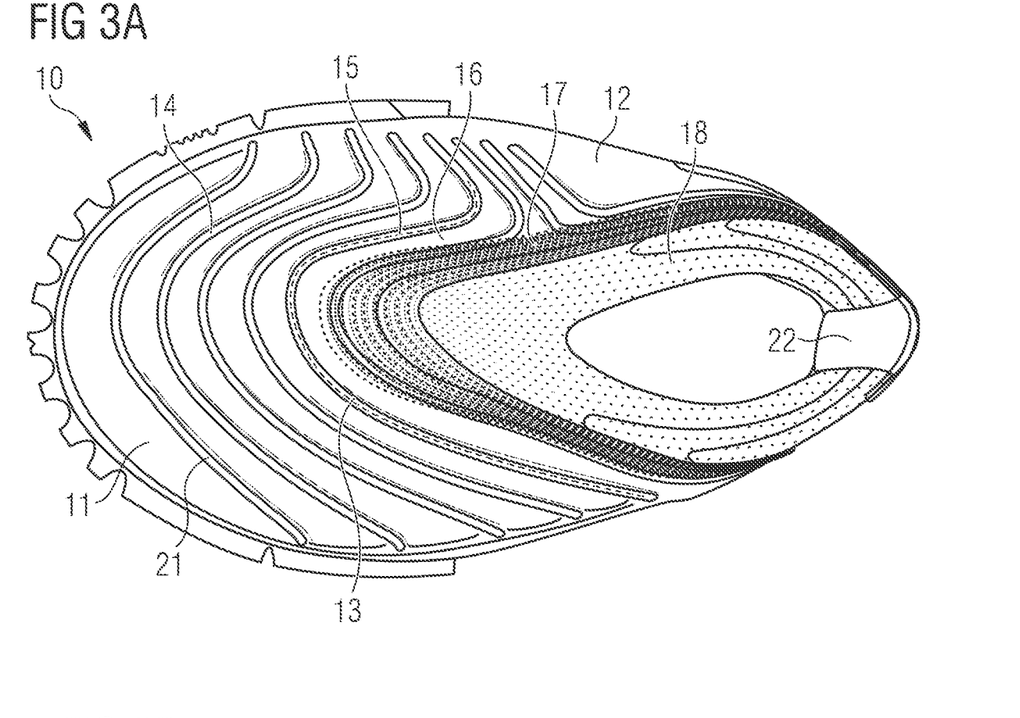
FIG. 3A-3B: another exemplary shoe upper according to the present invention.
Figure 3B:
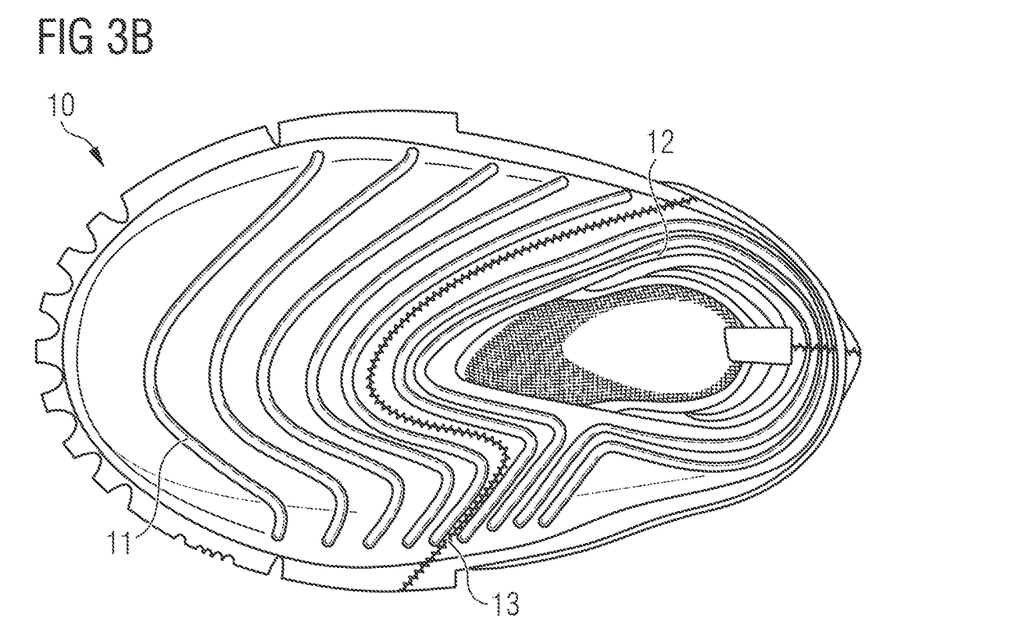

In this exemplary embodiment, the connecting region 13 comprises a seam at which the first sheet 11 and the second sheet 12 are connected by sewing. A seam tape 13 is applied directly onto the first sheet 11 and the second sheet 12, in order to protect the seam and to provide comfort to the wearer. No second coating 32 is present. In this example, the seam tape 33 has a film-like shape and comprises polyurethane. In this example, the seam tape 33 is applied above the seam, towards the outside of the shoe upper. However, it is also possible, that the seam tape is applied below the seam, towards the inside of the shoe upper. Moreover, in this example, the shoe upper 10 does not comprise a fourth region 17 to which the first coating has been applied in a discontinuous manner. FIGS. 3A and 3B show another exemplary shoe upper (10) according to the present invention. FIG. 3A shows the topside, i.e. what will be the outside on the final shoe. In its final form the shoe upper 10 will be lasted to create a three-dimensional shape and attached to a sole element in order to form a shoe.

The shoe upper 10 comprises (a) a first sheet 11, (b) a second sheet 12, (c) a connecting region 13 in which the first sheet 11 is connected to the second sheet 12, and (d) a first coating applied onto a first region 14 of the first sheet 11, a second region 16 of the second sheet 12, and a third region 15 of the connecting region 13, wherein the first region 14, the second region 16, and the third region 15 are connected.

The first coating has been applied as described with reference to FIG. 1 above. The second sheet 12 further comprises a fourth region 17 to which the first coating has been applied in a discontinuous manner. The fourth region 17 is connected to the second region 16. The second sheet 12 further comprises a fifth region 18 which is not covered by the first coating, wherein the fifth region 18 is connected to the fourth region 17.

In this example, the two sides of the upper 10 are connected in the heel region 22 already when the upper 10 is in a flat condition.

In this example, the shoe upper 10 comprises ripples 21 formed on the outside of the shoe upper on the first sheet 11. The ripples 21 allow an improved control of a ball and improve the stability of the shoe upper 10.

FIG. 3B shows the rear side, i.e. what will be the inside of the shoe upper 10 in the final shoe, of the exemplary shoe upper of FIG. 3A. FIG. 3B shows the first sheet 11, the second sheet 12, and the connecting region 13 in which the first sheet 11 is connected to the second sheet 12 of the exemplary shoe upper 10. Note that in this example, no coating has been applied to the rear side of the first sheet 11, the second sheet 12, or the connecting region 13. However, it is also possible to apply a first and/or second coating to the rear side, i.e. the inside, of the shoe upper.

Figure 4:
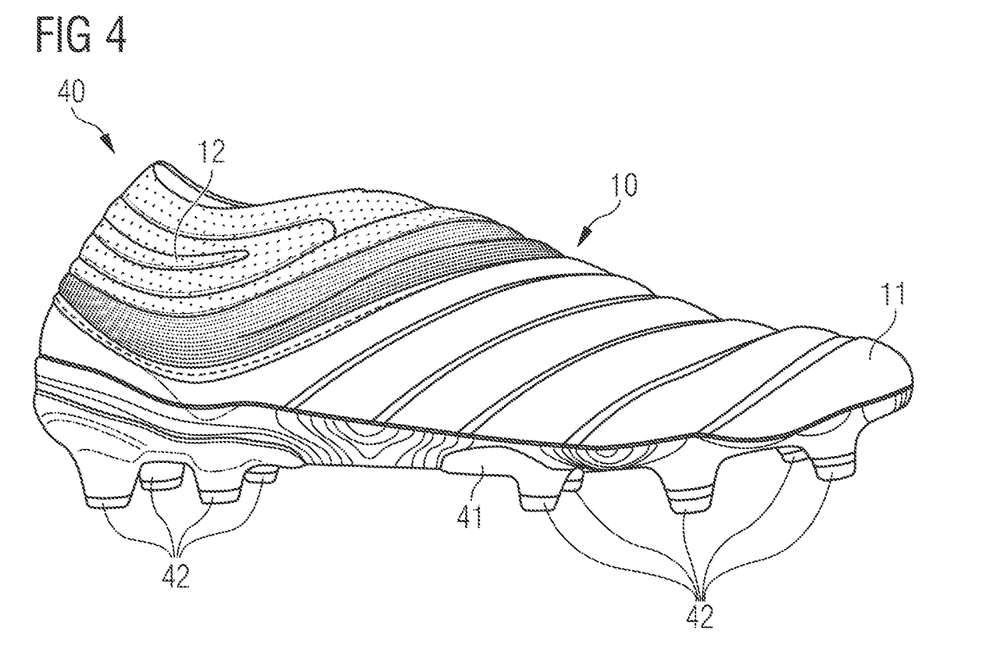
FIG. 4: a shoe according to the present invention.

FIG. 4 shows an exemplary shoe 40 comprising the shoe upper 10, as shown in FIGS. 3A and 3B, and a sole element 41 attached to the upper 10. The shoe upper 10 comprises a first sheet 11 and a second sheet 12. The exemplary shoe 40 was produced by producing a shoe upper 10 as described herein, lasting the shoe upper 10 to obtain a three-dimensional shape and attaching the sole element 41. The shoe 40 is a football boot and the sole element 41 comprises studs 42 for improved traction on the ground.

REFERENCE SIGNS

10: shoe upper,
11: first sheet,
12: second sheet,
13: connecting region,
14: first region,
15: third region,
16: second region,
17: fourth region,
18: fifth region,
21: ripple
22: heel region
31: first coating,
32: second coating,
33: seam tape,
40: shoe,
41: sole element, and
42: studs.

What is claimed is:

1. A method of producing a shoe upper, comprising:
   providing a first sheet, wherein the first sheet comprises a first outer surface comprising a first region, and wherein the first sheet comprises a leather,
   providing a second sheet, wherein the second sheet comprises a second outer surface comprising a second region, and wherein the second sheet comprises a textile,
   arranging the first sheet in a forefoot region of the shoe upper and arranging the second sheet in a heel region of the shoe upper,
   connecting the first sheet to the second sheet in a connecting region, wherein the second sheet extends rearward of the first sheet and the connecting region into the heel region, and
   applying a first coating onto the first region of the first sheet, the second region of the second sheet, and a third region of the connecting region, wherein the first region, the second region, and the third region are connected.

2. The method according to claim 1, wherein applying the first coating comprises screen printing the first coating.

3. The method according to claim 1, wherein the leather is a crust leather.

4. The method according to claim 1, wherein the first sheet has a thickness of between 0.5 and 1.2 mm.

5. The method according to claim 1, wherein the first coating has a thickness of between 0.08 and 0.3 mm.

6. The method according to claim 1, wherein providing the textile comprises warp or weft knitting the textile.

7. The method according claim 1, wherein connecting the first sheet and the second sheet comprises stitching the first sheet and the second sheet along a seam.

8. The method according to claim 1, wherein connecting the first sheet and the second sheet comprises applying a film to the connecting region.

9. The method according to claim 1, wherein the first coating comprises polyurethane.

10. The method according to claim 1, further comprising applying a second coating, comprising:
    covering at least the second region with the second coating, wherein the second coating is arranged between the second sheet and the first coating; and
    covering at least the third region with the second coating, wherein the second coating is arranged between the first or second sheet and the first coating.

11. The method according to claim 10, wherein the second coating comprises polyurethane.

12. The method according to claim 1, wherein the second sheet further comprises a fourth region and wherein the method further comprises applying the first coating to the fourth region in a discontinuous manner.

13. The method according to claim 12, wherein the fourth region is connected to the second region.

14. The method according to claim 12, wherein the second sheet further comprises a fifth region which is not covered by the first coating.

15. The method according to claim 14, wherein the fifth region is connected to the fourth region.

16. A method of producing a shoe comprising: producing a shoe upper according to claim 1, lasting the shoe upper, and attaching a sole element.

17. The method according to claim 1, wherein applying the first coating comprises screen printing the first coating, and wherein the first coating comprises an inner sublayer and an outer sublayer, and the first coating has a thickness of between 0.08 mm and 0.12 mm.

18. The method according to claim 1, comprising:
    connecting the first outer surface to the second outer surface in the connecting region; and
    applying the first coating such that the first coating comprises a continuous coating region applied to the first region, the second region, and the third region, and such that the coating defines at least a portion of an outermost surface of the shoe upper.

19. The method according to claim 12, wherein the discontinuous manner is such that the first coating is applied on opposing sides of a portion of the fourth region that is not covered by the first coating.

* * * * *